Inventors:
MURRAY F. KAMINSKY & GERALD SPECTOR
By John V. Regan
Attorney

Inventors:
MURRAY F. KAMINSKY &
GERALD SPECTOR
BY John V. Regan
Attorney

Inentors:
MURRAY F. KAMINSKY &
GERALD SPECTOR
BY John V. Regan
Attorney

Inventors:
MURRAY F. KAMINSKY &
GERALD SPECTOR
BY John V. Regan
Attorney

Inventors:
MURRAY F. KAMINSKY &
GERALD SPECTOR
BY John V. Regan
Attorney

United States Patent Office 3,440,409
Patented Apr. 22, 1969

3,440,409
CARD PROCESSING APPARATUS

Murray F. Kaminsky and Gerald Spector, Philadelphia, Pa., assignors to Radio Corporation of America, a corporation of Delaware Filed Jan. 4, 1966, Ser. No. 518,656
Int. Cl. G06k 7/01
U.S. Cl. 235—61.11 11 Claims This invention relates to card processing apparatus and, in particular, to an improved system for processing perforated record cards.

In general, a record card has M rows and N columns of index point positions, i.e. data storage locations, for a total of MN storage locations. One popular type card has twelve rows and eighty columns, and each column may store one or more different characters. Because of the dimensions of the card, more cards can be read per unit of time if the cards are read row-by-row. However, the receiver equipment may be designed to receive the read data a column at a time. In such a situation, the read data may be supplied row-by-row to the column conductors of an M row by N column memory, e.g., a coincident core memory, and the memory read out column-by-column after a complete card is read.

The timing pulses applied to the row conductors or windings of the memory must be applied sequentially and in proper time sequence with the presentation of successive card rows to the reading elements. In our invention, these timing pulses are generated by means of "light responsive coincidence gates." In particular, there is provided a first set of light responsive devices on the anterior side of the read station, there being one such device functionally corresponding to each different row of data on the record card. A second set of corresponding devices is located on the posterior side of the reader. Each of the devices in the first set may be serially connected with the corresponding device of the second set, and the various devices are so spaced relative to the reader that two corresponding devices receive radiation, e.g., light, when the corresponding row of the card is presented to the reader. Concurrently, at least one device in each of the other pairs is blocked by the card and receives no light.

When a high degree of read accuracy is demanded, it is customary to perform a continuous check on the operation of the read station by reading each row of a card twice, usually at different stations, and comparing the outputs of the stations. A disadvantage of such an arrangement is the added expense of a second station. It is another feature of our invention that this check is performed by means of an additional row of memory elements which are linked by the respective column conductors in the aforementioned memory. As each card row is read into the proper row of the memory, the data also is entered into the additional row of elements. The latter elements are read out a column at a time, between the reading of successive card rows, to that one of M modulo X counters which corresponds to the card row being read. After an entire card is read, the memory is read out a column at a time, and the data for each memory row is gated to a different other modulo X counter. At the completion of the memory read-out, the counts stored in the last-mentioned counters are compared with the counts stored in those corresponding counters which receive the outputs of the elements in the additional row of the memory. Noncorrespondence between the outputs of corresponding counters indicates an error in the memory processing.

The operation of the reading elements themselves is monitored by performing an "all-off" and "all-on" check. The all-off check is performed by pulsing the row conductor of the additional memory when that portion of a card between one end row and the associated edge of the card is present at the read station. Any information sensed during read-out of this row indicates that a read element was providing an output when no perforation was sensed. An "all-on" check is performed by pulsing the row conductor of the additional memory row either before the card enters the read station or after the trailing edge of the card leaves the read station. If any storage element in the additional row is not switched at this time, this condition is detected and used as an indication that one of the reading elements is inoperative.

In the accompanying drawing, like reference characters denote like components, and:

In the discussion which follows, the system will be described for convenience as one adapted to handle record cards having twelve rows and eighty columns. However, it should be understood that the particular numbers of rows and columns are of no importance insofar as the invention is concerned. Also, the system will be described as one in which cards are read row-by-row to a buffer memory, and the memory read out column-by-column. The cards could, alternatively, be read column-by-column to memory, and the memory read out row-by-row. Therefore, the terms "row" and "column" have no real significance except insofar as they denote two different coordinate directions of a record card. It is in this latter, generic sense that these terms are used hereinafter and in the appended claims. The term "line" also is used in this generic sense in the claims.

Figures 1, 6:
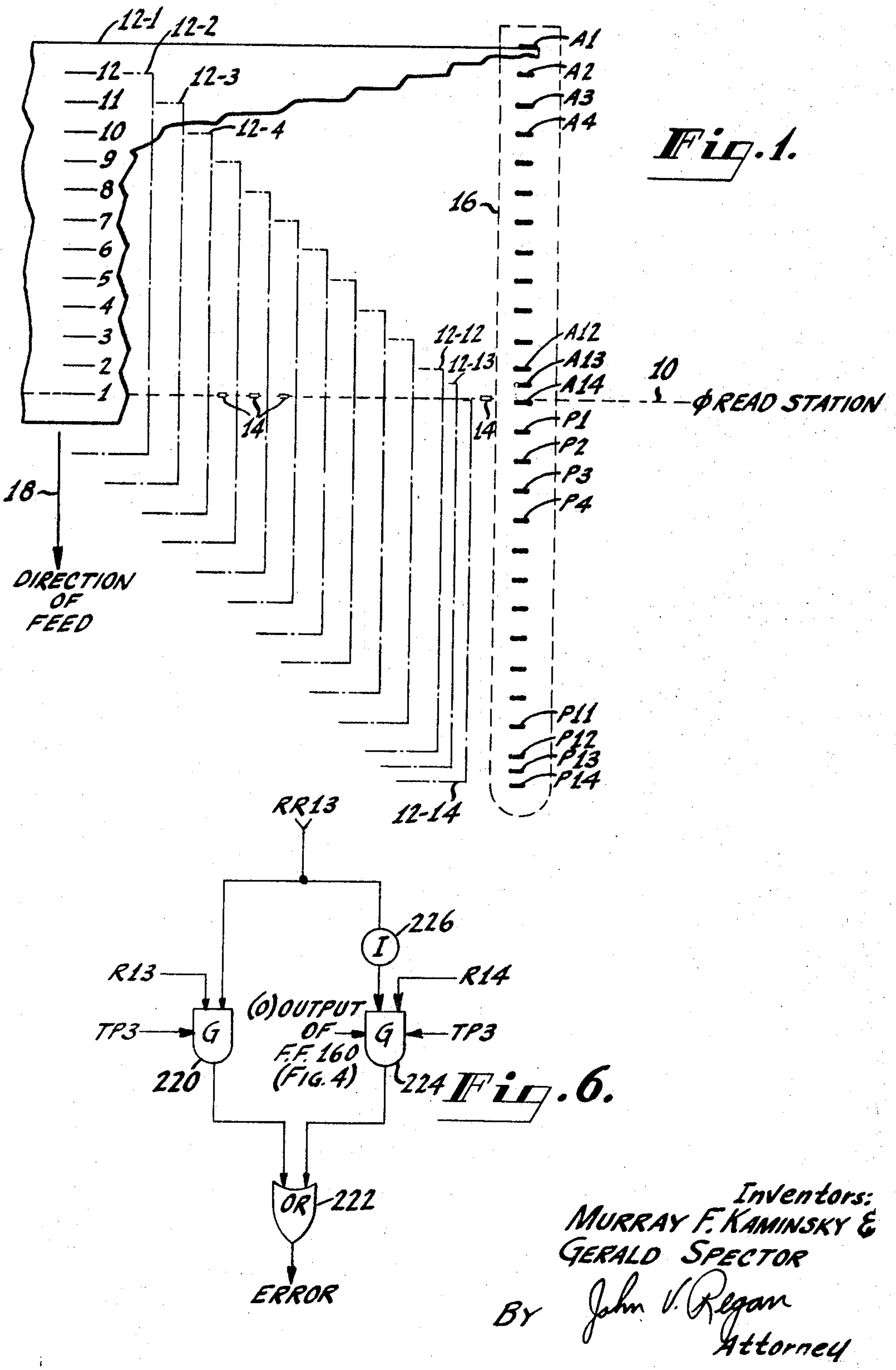
FIGURE 1 is a line drawing for the purpose of illustrating the positions of the light actuated SCR's which generate the timing or control pulses.
FIGURE 6 is a block diagram of circuitry for performing the all-on and all-off check of the reader elements.

In FIGURE 1, dashed line 10 represents the centerline of a read station. The reading elements 14, only a few of which are illustrated, are centered on this line, and spaced so that each element is positioned to read a different column of a record card. These elements preferably are light actuated, high output devices having thyratron-like characteristics, such as light actuated silicon controlled rectifiers, in which case the output can drive a memory line directly without the need for amplifiers, etc. Alternatively, the read elements could be solar cells, photodiodes or the like driving conventional SCR's coupled thereto. A first set of radiation responsive devices $A_1 \ldots A_{12}$, e.g. light responsive devices, is disposed along the transport path on the anterior side of the read station. A second set of light responsive devices $P_1 \ldots P_{12}$ is disposed on the posterior side of the station. The distance between adjacent devices, e.g. $A_1$ and $A_2$, of a set is equal to the spacing between adjacent row centerlines of a record card. These devices preferably are light actuated, high output devices having thyratron-like characteristics. Alternatively, as in the case of the read elements, they could be solar cells, photodiodes, etc., driving conventional SCR's. As a card moves through the read station, that portion of the card between one end column and the edge of the card passes over and covers devices $A_1 \ldots A_{12}$ and $P_1 \ldots P_{12}$ in succession.

The corresponding elements of like subscript notation in the two sets are related to each other and are functionally related to the row of like order on the record card. In particular, the related devices of each pair, e.g. $A_1$ and $P_1$, are so located relative to the read station that both devices are unblocked by the card and receive light radiation from a source 16 when the corresponding first row of the record card is in reading position. At that time, at least one device of each of the other pairs $A_2$ and $P_2$, $A_3$ and $P_3$, etc. is blocked by the card and receives no light. As will be described hereinafter, the two SCR devices of a pair, e.g. $A_1$ and $P_1$ are connected in series to form a coincidence gate which has a high conduction current path when both devices are actuated by light concurrently.

A record card moving through the read station is shown in partial outline for several different positions along the transport path. The partial outlines 12–1 . . . 12–14 are shown in non-overlapping relation for clarity of drawing only. It should be understood that the card moves in the direction of arrow 18 only, i.e. normal to the card rows, and that the right edge portion of a card at the reading station covers various ones of the devices $A_1$ . . . $A_{12}$ and $P_1$ . . . $P_{12}$, depending on the card's position. A card has the relative positions shown by outlines 12–1 . . . 12–12 as card rows 1 . . . 12, respectively, are presented to the reading elements 14.

In addition to the SCR's, two other light responsive elements A13 and A14 are provided in the first set and two corresponding elements P13 and P14 are located in the second set. These elements are not silicon control rectifiers, but are rather light responsive devices, such as solar cells, which have no storage capability. Elements A13 and P13 are so located along the transport path that both are unblocked and receive light when a portion of the record card between row 12 and the trailing edge of the card is present at the reader. The position of the card for this condition is represented by card outline 12–13. The remaining elements A14 and P14 are so located as to be unblocked and receive light after the trailing edge of the card leaves the read station. The position of the record card for this condition is represented by the partial card outline 12–14.

Figure 2:
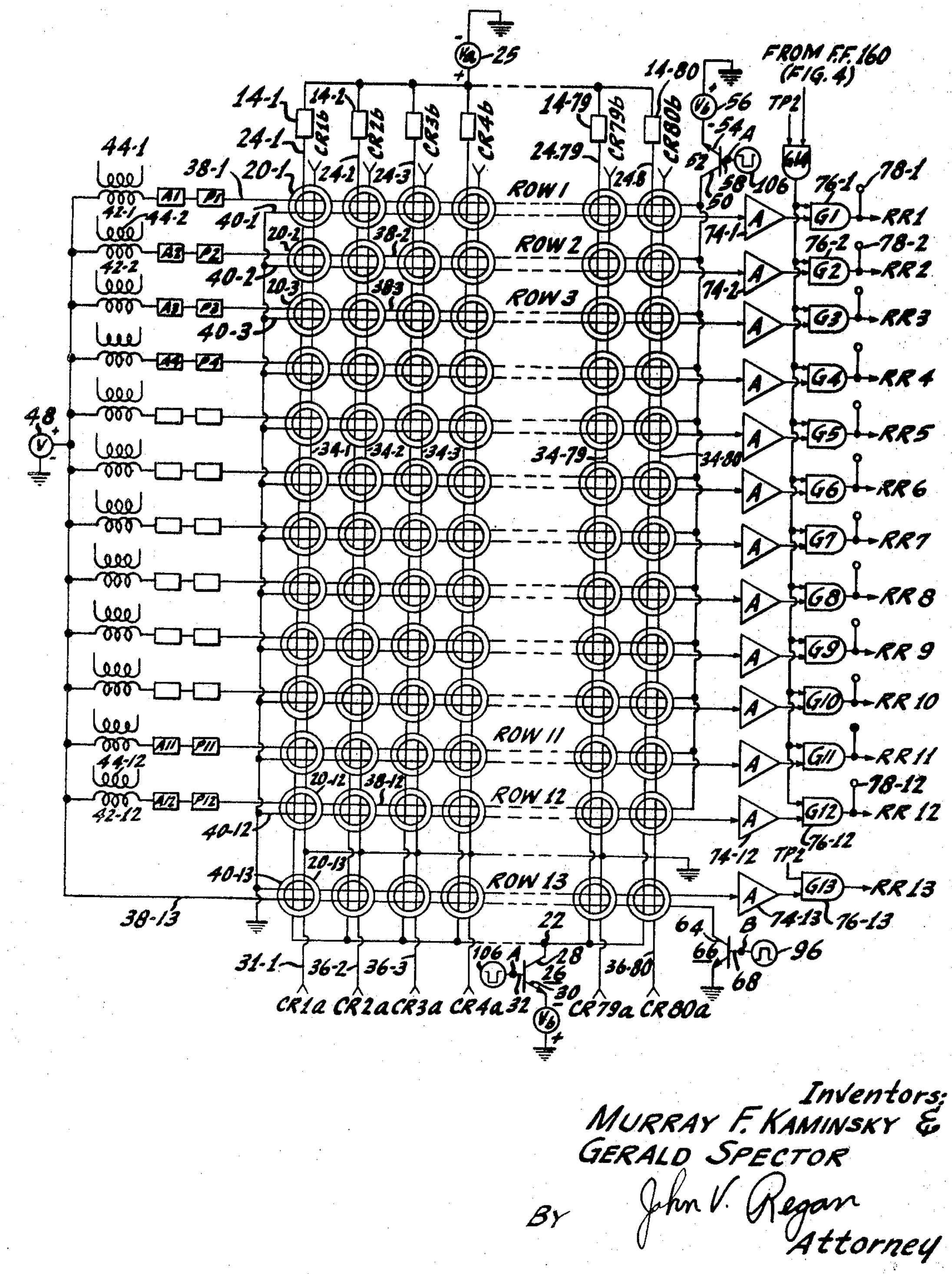
FIGURE 2 is a view of a portion of a core buffer memory, and the input and output circuitry thereof.

In FIGURE 2, a buffer memory comprises an array of thirteen rows and eighty columns of storage elements, illustrated as memory cores. Only a few of the columns are shown, in order to simplify the drawing. The eighty columns of cores correspond to the eighty columns of a record card, and twelve of the rows, namely rows 1 . . . 12, of cores correspond to the like numbered rows of a record card. The thirteenth row of cores, as will become apparent, is provided for checking purposes. In the illustrative memory, there are two row conductors for each row of cores, and two column conductors for each column of cores.

Column 1 has a first conductor 24–1 which links all of the cores 20–1 . . . 20–13 in the column. Read element 14–1 for column 1, which preferably is a light actuated SCR, is connected between the upper end of conductor 24–1 and the positive terminal of a source 25 of $V_a$ volts. The lower end of this conductor is connected to a junction point 22. Each of the other columns of cores has a similar conductor 24–2, 24–3 . . . 24–80 which links all the cores in that column, and which is connected at its upper end to its associated read element 14–2, 14–3 . . . 14–80, respectively, and at its lower end to the common junction point 22. An NPN transistor 26 has its collector 28-emitter 30 path connected between junction point 22 and the negative terminal of a source of $V_b$ volts. Base electrode 32 is connected to a source 106 (to be described) of negative pulses which periodically turn off transistor 26 to turn off the reading elements 14–1 . . . 14–80.

Column 1 has a second conductor 34–1 which links only the cores 20–1 . . . 20–12 in row 1 through row 12. This conductor is grounded at its lower end, and is connected at its upper end to receive a column read-out pulse CR1*b*. In a similar manner, each other column has a second winding 34–2 . . . 34–80 which links the cores in the first twelve rows thereof, is grounded at its lower end, and is connected at its upper end to receive a column read-out pulse CR2*b* . . . CR80*b*, respectively. Each of the cores in the thirteenth row has a second conductor 36–1, 36–2 . . . 36–80 which links only that core and is grounded at its upper end. The lower ends of these latter conductors are connected to receive column read-out pulses CR1*a*, CR2*a* . . . CR80*a*, respectively.

The first conductor 38–1 for row 1 links all the cores for that row, and is connected at its right end to the collector electrode 50 of an NPN transistor 52. Emitter electrode 54 thereof is connected to the negative terminal of a source 56 of negative potential, and base electrode 58 is connected to the previously mentioned pulse source 106. The light actuated SCR's A1, P1, related to the first row of the record card, are serially connected with a transformer primary winding 42–1 between the left end of conductor 38–1 and the positive terminal of a source 48 of V volts. When the first row of a card is being read. A1 and P1 both receive light and provide a low impedance path for a half-select row current flowing from source 48 to transistor 52. This current, flowing through primary winding 42–1, produces a pulse in secondary winding 44–1 during the current transient.

Each of the other rows 2 through 12 of the memory has a similar conductor which is connected at its right end to the collector 50 of transistor 52. The left end of each of these conductors is connected to the voltage source 48 through the series combination of a primary winding and the two associated SCR's for that row. For example, the left end of the conductor 38–12 in row 12 is connected to source 48 through primary winding 42–12 and the light actuated SCR's A12 and P12, which are unblocked when the twelfth row of a card is being read. The left end of the conductor 38–13 is row 13 is connected directly to source 48, and the right end is connected to the collector 64 of a grounded emitter NPN transistor 66. Base 68 is connected to a source 96 (to be described) of positive pulses which are applied periodically to send a half-select current through the conductor 38–13.

At the right of FIGURE 2 are thirteen amplifiers 74–1 . . . 74–13. A second conductor for each row is connected at its right end to a different amplifier, and is grounded at its left end. For example, conductor 40–1 for row 1 is connected to amplifier 74–1; conductor 40–2 for row 2 is connected to amplifier 74–2, etc. These conductors are sense, or read-out conductors. Each of the amplifiers 74–1 . . . 74–13 has its output applied as one input to a different coincidence gate 76–1 . . . 76–13, respectively. A timing pulse TP2 is applied directly as a second input to gate 76–13, and is applied to the other gates by way of a fourteenth coincidence gate 79. A second input to gate 79 is energized during memory readout from a flip-flop 160 (FIGURE 4) to be described. Each of the gates 76–1 . . . 76–13 has an output labeled "RR1," "RR2," etc., which is supplied to checking equipment (FIGURE 6) to be described. "RR" is an abbreviation for "read row." In addition, each of the gates 76–1 . . . 76–12 for the first twelve rows has an output terminal 78–1 . . . 78-12, respectively, at which the stored card information is read out a column at a time to receive equipment (not shown).

Since the light actuated SCR's 14–1 . . . 14–80 in the read station and the light actuated SCR's A1 . . . A12 and P1 . . . P12 are bistable devices, it is necessary to switch these elements to a reset or reference state after each card row is read. This is accomplished by applying appropriate signals at the base electrodes of transistors 26 and 52 from pulse source 106 to render the transistors nonconducting. It also is necessary to send a half-select current through the conductor 38–13 of row 13 when it is desired to read. This is accomplished by control signals from source 96 turning on transistor 66 during selected intervals of time. The circuitry for deriving these control signals is illustrated in block form in FIGURE 3.

Figure 3:
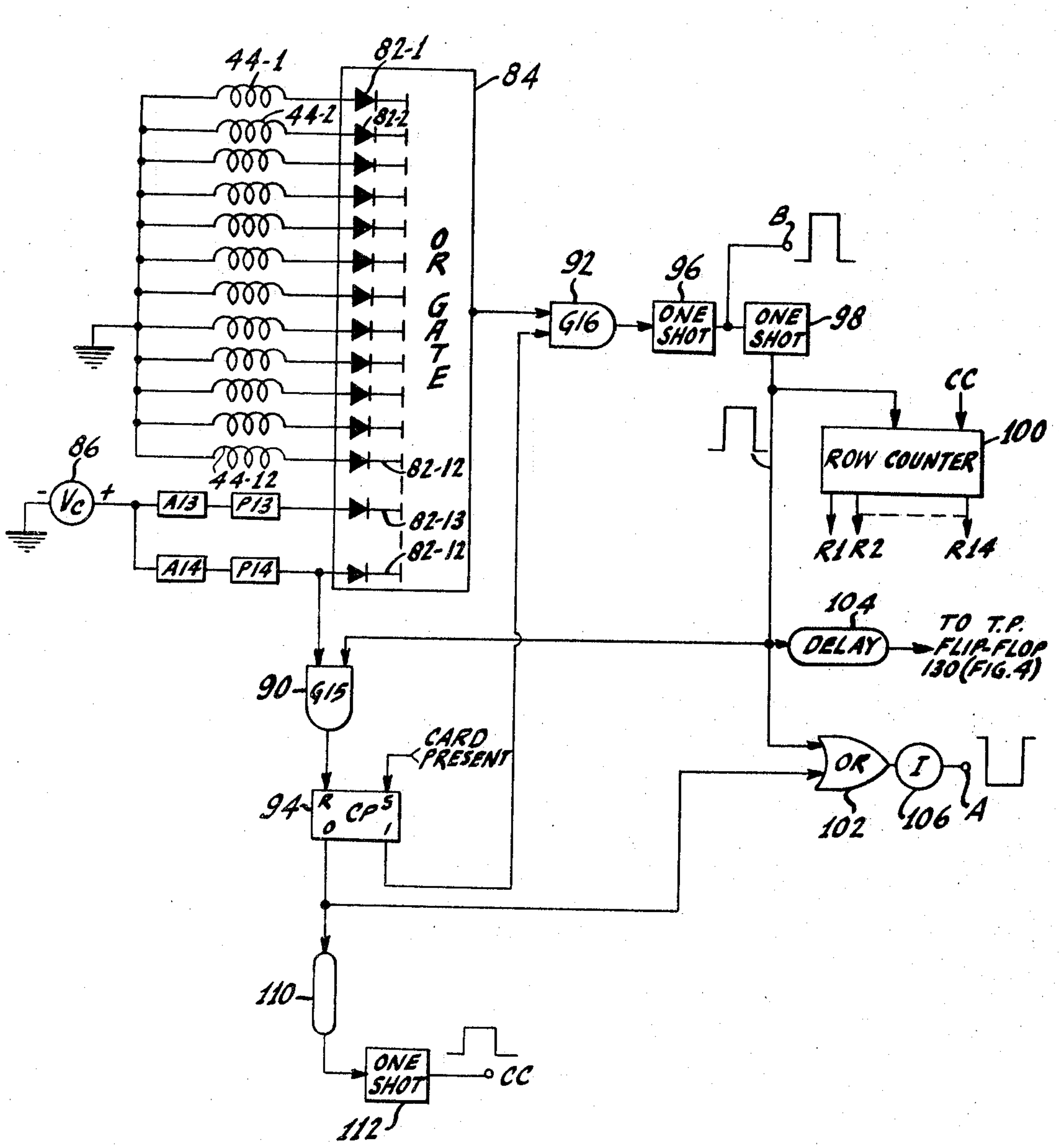
FIGURE 3 is a block diagram of circuitry for generating various system control pulses and levels in response to the operation of the SCR's.

In FIGURE 3, each of the plurality of transformer secondary windings 44–1 . . . 44–12 is connected in series between circuit ground and a different diode 82–1 . . . 82–12 of an OR gate 84. These transformer windings 41–1 . . . 44–12 are the secondary windings of the transformers in the row conductors for the core memory, located at the lefthand side of FIGURE 2. In addition, the light sensitive device A13 and P13 are serially connected between a source 86 of positive potential and a further diode 82–13 of the OR gate 84. Similarly, the light sensitive devices A14 and P14 are serially connected between the voltage source 86 and another diode 82–14 or OR gate 84. The junction between element P14 and diode 82–14 is connected to one input of a fifteenth AND gate 90.

The output of OR gate 84 is applied to one input of a sixteenth AND gate 92, the other input of which is connected to the (1) output of a card present flip-flop 94. This flip-flop is switched to the set state whenever a card is moved into the read station. The (1) output of the flip-flop 94 then goes high and primes one input of the sixteenth AND gate 92.

Each occurring output signal of gate 92 triggers a first one-shot 96 to produce a positive going output pulse at terminal B. Terminal B is conected at the base of transistor 66 (FIGURE 2), and these pulses have a polarity and amplitude to render transistor 66 conducting. When transistor 66 conducts, a half-select current flows in row conductor 38–13. OR gate 84, and thus one-shot 96, produces an output pulse as each row of a record card is presented to the reader. Accordingly, each row of card data is not only entered into the proper row of the memory, but also is entered into the cores of the thirteenth row. The duration of the output pulse of one-shot 96 is adjusted to be of sufficient duration to assure proper read-in of data to the cores of row 13.

OR gate 84 also produces a thirteenth output signal when that portion of a card between the last row thereof and the trailing edge of the card is present at the reader. If any reading element detects light at this time, the associated core in the thirteenth row of the memory switches states. OR gate 84 produces a fourteenth output signal as the trailing edge of the card leaves the read station. Again, those reading elements which then are receiving light will cause the associated cores in the thirteenth row to switch.

The output of the first one-shot 96 triggers a second one-shot 98 at the trailing edge of the positive pulse. The positive pulse output of one-shot 98 is applied (1) to a second input of the fifteenth AND gate 90 to reset the card present flip-flop 94 after the card leaves the reader, (2) to the trigger (T) input terminal of a row counter 100, (3) to one input of an OR gate 102, and (4) to the input of a delay means 104. The output of delay means 104 is applied as an input to a timing pulse flip-flop (FIGURE 4) to be described hereinafter.

The output of OR gate 102 is applied to an inverter 106, the output of which is a negative pulse appearing at a terminal labeled A. This terminal is connected at the base electrodes of the transistors 26 and 52 in FIGURE 2, and is of such polarity and magnitude as to turn off these transistors for the duration of the pulse. When these transistors are rendered nonconductive, the current paths for the various SCR's in the read station and in the card position detectors are interrupted. Breaking the current paths for these devices causes these devices to turn off, i.e. to switch from a state of high conductivity to a state of low conductivity. Thus, the duration of the output pulse from one-shot 98 must be long enough to turn off the SCR's, and long enough to prevent reactuation of these devices before the next card row is moved into reading position.

An additional input to the OR gate 102 (FIGURE 3) is supplied by the (0) output terminal of the card present flip-flop 94 when no card is present in the reader. The output of inverter 106 then remains low and prevents entry of data into the memory. When the flip-flop 94 becomes reset at the end of a card cycle, its (0) output is applied through a delay means 110 to a third one-shot 112. This one-shot, when triggered, produces a positive pulse at a terminal labeled CC. This terminal is connected to the clear or reset input terminal of the row counter 100 to reset that counter to a reference condition. The pulse at terminal CC also is used elsewhere in the system for reset purposes.

The cores in row 13 (FIGURE 2) of the memory array are read out sequentially, between the reading of successive card rows, by means of signals CR1*a* . . . CR80*a*. The cores in rows 1 through 12 are read out a column at a time under the control of signals CR1*b* . . . CR80*b* after a complete card has been read. The control logic for deriving these control signals is illustrated in FIGURE 4 and will now be described.

Figure 4:
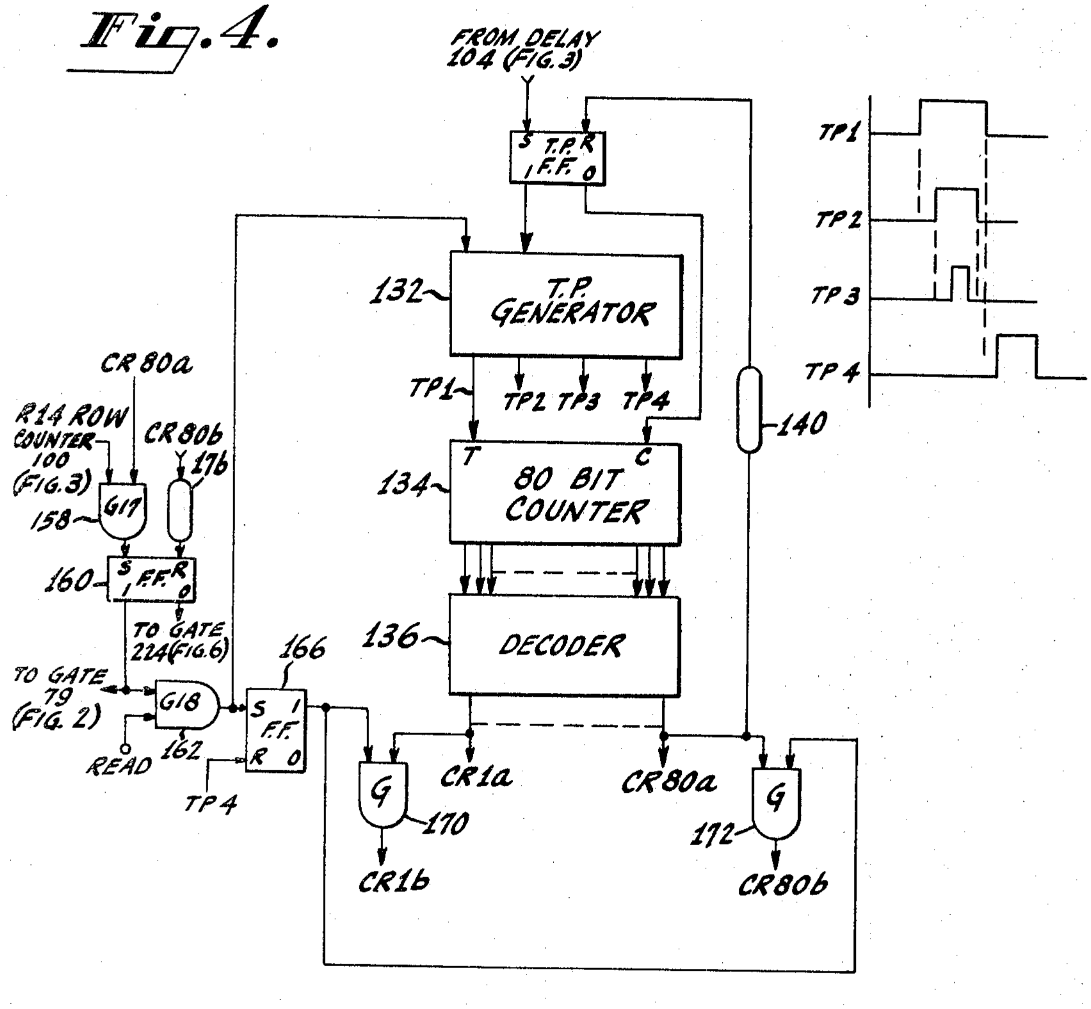
FIGURE 4 is a block diagram of the timing control system for memory read-out.

The logic in FIGURE 4 is controlled by a timing pulse flip-flop 130, the set (S) input terminal of which is connected to the output of the delay means 104 in FIGURE 3. This flip-flop 130 is switched to the set state by the output of one-shot 98 (FIGURE 3) after each card row is read into memory, after the area of the card between the last row of the card and the trailing edge of the card passes the reader, and again after the trailing edge of the card leaves the read station. When the flip-flop 130 is in the set state, the (1) output thereof enables a timing pulse generator 132 to generate a plurality of sets of timing pulses TP1, TP2, TP3 and TP4. A set of these timing pulses is shown at the right of FIGURE 4.

The TP1 output of the generator 132 is applied at the trigger input terminal of an 80 bit counter 134, which could be a ring counter or a binary counter by way of example. If a binary counter is employed, it is necessary to decode the outputs thereof and, for this reason, a decoder 136 is shown connected at the outputs of the counter 134. The decoder 136 has 80 outputs corresponding to the 80 different possible counts in the counter 134. Only two of the decoder outputs are illustrated, but it should be understood that there are a total of 80 outputs CR1*a* . . . CR80*a*. These are the column read-out pulses applied to the column windings 36–1 . . . 36–80 of the thirteenth row of cores in the memory. Each of these outputs is energized in response to a different count in counter 134. When the count of 80 is reached, the output on decoder output line CR80*a* goes high. This output is delayed in a device 140 and applied to reset the timing pulse flip-flop 130. The timing pulse generator 132 then becomes disabled and generates no more timing pulses. Counter 134 is cleared to the reference state by the (0) output of the timing pulse flip-flop 130 when that flip-flop becomes reset.

In the present system it is necessary to generate the control pulses CR1*a* . . . CR80*a* after each line of card data is sensed by the card reader, since these control pulses read out the cores in row 13 after each card row is read. However, the remaining cores in the first twelve rows of the memory are not read out until after the trailing edge of the card leaves the read station. Thus, it is desired to generate the control pulses CR1*b* . . . CR80*b* at the end of a card only. Moreover, since the data stored in the first twelve rows generally is read into a computer memory, it is desirable that CR1*b* . . . CR80*b* be generated under control of the computer. The manner in which these pulses is generated will now be described.

At the left of FIGURE 4 is a flip-flop 160 which becomes set by the output of a seventeenth coincidence gate 158. Gate 158 produces an output in response to control pulse CR80*a* when the row counter 100 (FIGURE 3) is storing a count of fourteen (at the trailing edge of a card). The CR80*a* pulse occurs after the thirteenth row of the memory is read out following the trailing edge of the card. The (1) output of this flip-flop is applied at one input of an eighteenth AND gate 162, the other input of which receives a series of eighty read command pulses supplied by the computer or other data receiving equipment when it is ready to receive the data from memory. Thus, gate 162 produces a series of eighty pulses at its output after the card leaves the read station. Each output of gate 162 triggers the TP generator 132 to produce one set of timing pulses, of which the TP1 pulse advances counter 134 one count.

Each output pulse from gate 162 also is applied at the set input terminal of a flip-flop 166. The (1) output terminal thereof is applied to one input of each of a set of coincidence gates, only two of which gates 170 and 172 are shown. There are eighty such gates, and each gate is connected to receive a different one of the outputs CR1*a* . . . CR80*a* from decoder 136. Flip-flop 166 is reset by each TP4 timing pulse, and set again by the next read command pulse from the computer. Thus, in response to the series of eighty read pulses, counter 134 is advanced sequentially, and the column read-out pulses CR1*b* . . . CR80*b* are generated successively to read out the first twelve rows of the memory at a rate determined by the computer. The CR1*a* . . . CR80*a* control pulses also are generated at this time, but the outputs of the thirteenth row of cores in the memory are not used at this time. Flip-flop 160 is reset after memory read-out by the CR80*b* pulse, delayed by device 176.

Figure 5:
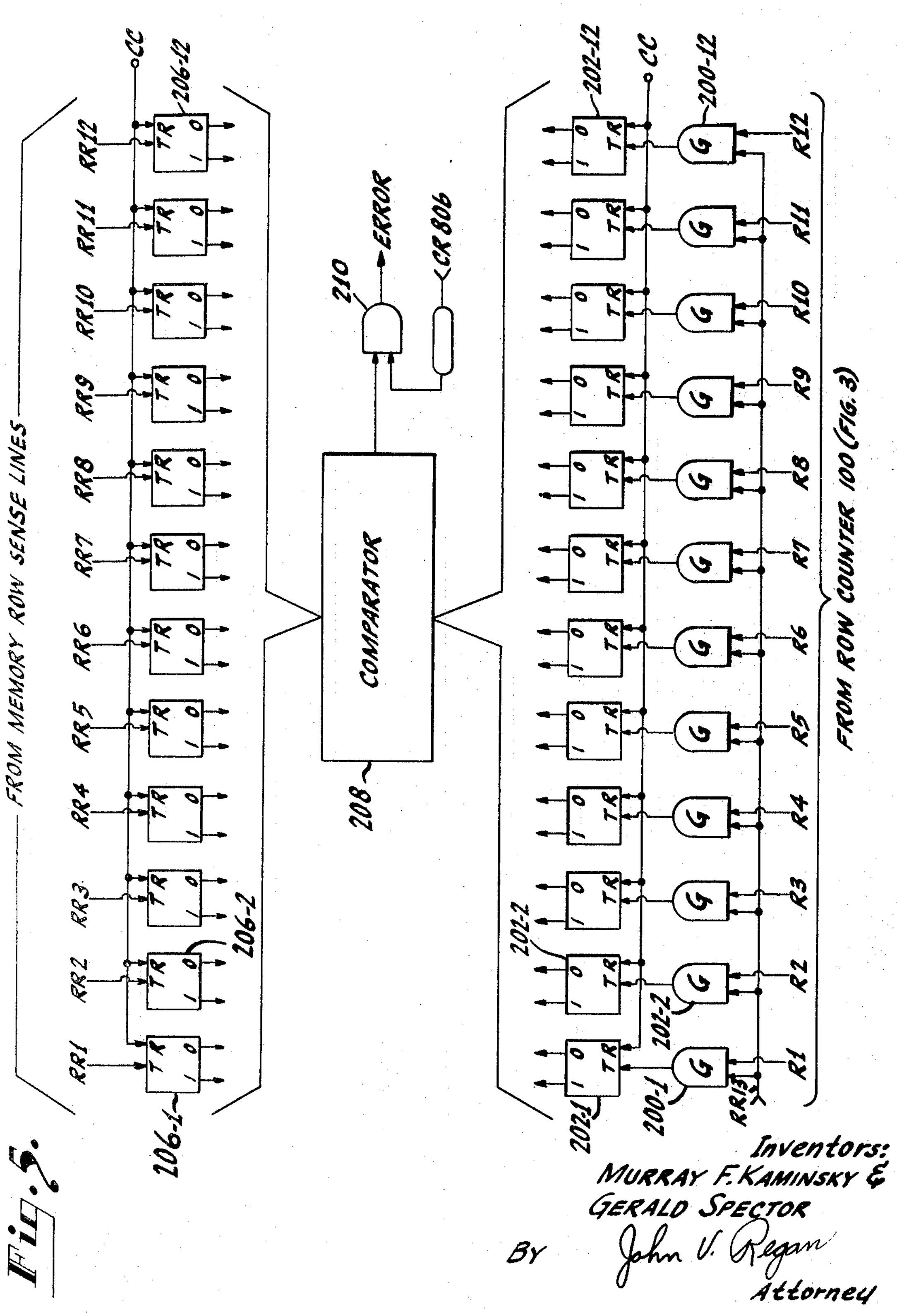
FIGURE 5 is a block diagram of the modulo X counters and comparator used to check the operation of the reader.

The thirteenth row of cores is read out serially by the read-out signals CR1*a* . . . CR80*a*, in the manner described heretofor, after each row of the card is read. If any core in the thirteenth row was switched to the set state during the reading of a card line, that core is switched to the reset state during memory read-out, and a pulse appears on the row sense conductor 40–13. This pulse passes through amplifier 74–13, and through AND gate 76–13 during timing pulse TP2. The output of gate 76–13 is applied as one input to each of a group of twelve AND gates 200–1 . . . 200–12 (FIGURE 5), there being one AND gate related to each of the first twelve rows of the memory. The second inputs to these AND gates are derived from the outputs of the row counter 100 (FIGURE 3). Thus, for example, after the first card row has been read into the memory, a count of one is stored in the row counter. The counter output enables a second input of the first AND gate 200–1 (FIGURE 5). Accordingly, when the thirteenth row of cores is read out, the information is passed through AND gate 200–1. Likewise, after the last row of the card has been read into memory, the row counter stores a count of twelve, and the counter output enables the second input of gate 200–12. When the thirteenth row of cores is read out, this information is passed through the gate 200–12.

Each of a first set of twelve modulo X counters 202–1 . . . 202–12 has its trigger input terminal connected to the output of a different one of the gates 200–1 . . . 200–12. These modulo X counters are illustrated in the drawing as being triggerable flip-flops. Accordingly, after the last row of the card is read into memory and the thirteenth row of cores is thereafter read out, the modulo counters 202–1 . . . 202–12 should be storing the mod X count of the number of cores in rows 1 through 12, respectively, of the memory that have been switched during the read-in operation.

After an entire card read operation, the first twelve rows of the memory are read out a column at a time by the readout pulses CR1*b* . . . CR80*b*. The information is read out of these rows on conductors 40–1 . . . 40–12 (FIGURE 2) to the AND gates 76–1 . . . 76–12, respectively. The outputs of these gates are applied to separate other mod X counters 206–1 . . . 206–12 (FIGURE 5). After the memory is read out, the counts stored in these latter counters 206–1 . . . 206–12 should be the same as the counts stored in the other mod counters 202–1 . . . 202–12, respectively, if the memory operated properly.

To check on the operation of the memory, the outputs of all of the mod counters are supplied to a comparator 208, where the counts stored in the first set of counters 202–1 . . . 202–12 are compared with the counts stored in the counters 206–1 . . . 206–12, respectively. Comparator 208 produces an output signal any time the compared counts are not equal. This output is supplied to an AND gate 210. After the last column of the memory has been read out, a second input to AND gate 210 is enabled by the delayed CR80*b* pulse. If a comparator output is present at this time, gate 210 produces an output to indicate an error condition. All of the mod counters are reset at the end of a card cycle by the output of one-shot 112 (FIGURE 3).

As mentioned previously, one-shot 96 (FIGURE 3) produces a pulse to turn on transistor 66 (FIGURE 2) when that portion of a record card between the last row thereof and the trailing edge of the card is present at the read station. A half-select current then flows through the row conductor 38–13 of the thirteenth row of cores. None of the read elements 14–1 . . . 14–80 should be receiving light at this time and, in particular, none of these read elements should be providing an output at this time. Accordingly, none of the cores in the thirteenth row of the memory should be switched to the set state. However, if one of the reading elements is malfunctioning, it is possible that that read element will produce a continuous output, in which case the associated core in row 13 will become set. Of course, this means also that the cores in rows 1 through 12 of that column also will be set during a card read, and will store incorrect information.

A check of the reader elements to detect such a condition is performed by the circuitry of FIGURE 6. In FIGURE 6, an AND gate 220 has one of its inputs connected to the output of gate 76–13 (FIGURE 2), and receives the read-out information from the thirteenth row of cores. A second input to this gate is enabled by the output of the row counter 100 (FIGURE 3) when that portion of a record card between the last row thereof and the trailing edge of the card is present at the reader. A third input to the gate is the timing pulse TP3 from the pulse generator 132 (FIGURE 4).

Since none of the cores in row 13 should be in the set state at this time, the output from gate 76–13 (FIGURE 2) should remain low during the entire read out of the thirteenth row of cores. Consequently, gate 220 (FIGURE 6) should produce no output pulse during the read-out. If any core in row 13 is in the set state, indicating an erroneous operation of the read elements or the memory elements in row 13, gate 220 will produce an output pulse when that core is read out. The output of gate 220 is applied to an OR gate 222, and any output from gate 222 during this read-out operation signals an error condition.

It may also happen that one of the read elements may fail such that the read element will produce no output even when it receives light. To check for this condition, an additional AND gate 224 is provided in FIGURE 6. Pulse source 96 enables transistor 66 (FIGURE 2) after the trailing edge of the card passes the read station. All of the read elements 14–1 . . . 14–80 then should be actuated, and all of the cores in the thirteenth row of the memory should be switched to the set state. The thirteenth row then is read out sequentially, column-by-column, by the pulses CR1*a* . . . CR80*a* to the gate 76–13. The output of this gate is passed through an inverter 226 (FIGURE 6) to the gate 224. A second input to this gate is energized by the output of the row counter 100 (FIGURE 3) at this time; a third input to the gate is enabled by the timing pulses TP3 as each column of memory row 13 is read out, and; a fourth input to gate 224 is enabled whenever flip-flop 160 (FIGURE 4) is in the reset state, i.e. at all times except when the first twelve rows of the memory are being read out.

Since all of the cores in the thirteenth row should now be in the set state, gate 76–13 should produce a series of eighty positive pulses during read-out of the thirteenth row of cores, which pulses overlap the timing pulses TP3. However, since the output of gate 76–13 is inverted, the output of inverter 226 should be low during the presence of each read-out pulse, and gate 224 should produce no output pulses. If one of the read elements 14–1 . . . 14–80 is defective, the corresponding core in the thirteenth row of the memory will not be set. Conseqently, when that column of the thirteenth row is read out, gate 76–13 will produce no positive pulse, the output of inverter 226 will be positive, and gate 224 will produce a positive output pulse. This output pulse will pass through OR gate 222 and signal an error condition, indicating that one of the read elements is defective.

After the all-on check is performed, the first twelve rows of the memory are read out a column at a time, in the manner previously described, under control of the computer. Although the row counter stores a count of fourteen at this time, the all-on check circuitry is disabled because flip-flop 160 (FIGURE 4) is in the set state, its (0) output is then low, and gate 224 (FIGURE 6) is disabled.

It should be mentioned that, with a change in the positions of sensors A13, A14, P13, and P14 (FIGURE 1) and a suitable change in the system logic, the all-on check could be performed before a card enters the read station, and the all-off check could be performed when that portion of a card between the leading edge and the first row of the card is present at the read station.

What is claimed is:

1. In a processor for documents having M lines of data storage positions, the combination comprising:

a transport path along which documents are fed singly in a direction transverse to the lines of data storage positions;

a row of processing elements transverse to the direction of feed for processing the documents a line at a time;

a first set of M radiation responsive means disposed along said path at different distances from said processing elements on the anterior side thereof, each of the radiation responsive means in said first set being functionally related to a different one of the M lines on a document being processed;

a second set of M corresponding radiation responsive means disposed along said path at different distances from said processing elements on the posterior side thereof;

a source of radiation for said radiation responsive means, said document passing between said source and said radiation responsive means;

each of the M radiation responsive means of the first set and the corresponding radiation responsive means of said second set being so located relative to each other and to said processing elements that both of the two corresponding radiation responsive means receive radiation from said source when the related line on the document being processed is in position to be processed by said processing elements, and with that document interrupting the radiation path to one of said two radiation responsive means when any other line on that document is in position to be processed; and M coincidence gate means each including a separate corresponding pair of said radiation responsive means.

2. The combination as claimed in claim 1, wherein said radiation responsive means are light responsive means having thyratron-like characteristics, said source of radiation is a source of light, said documents are punched record cards having M lines of N index point positions each, and wherein said row of processing elements includes N light responsive means having thyratron-like characteristics and being located to sense concurrently the N index point positions in a card line.

3. The combination as claimed in claim 1, wherein said radiation responsive means include light responsive elements located as defined in claim 1 and devices driven by said elements and having thyratron-like characteristics, said source of radiation in a source of light, and said processing elements are light responsive perforation sensing means having thyratron-like characteristics.

4. The combination as claimed in claim 2, including: a memory having $M+1$ rows by N columns of coincident input storage elements, each of the first M rows of storage elements corresponding to a different line of a card, and each of the N storage elements of a row corresponding to a different index point position in a card row; a separate row input conductor individual to each row of storage elements; means coupling the output of each of said M coincidence gate means to the row conductor of the corresponding row of storage elements; a separate column conductor for each of the N columns; and means coupling the output of each of said perforation sensing elements to a corresponding column conductor.

5. The combination as claimed in claim 4, including an OR gate connected to receive the outputs of all of said M coincidence gate means; means responsive to an output signal from said OR gate for applying a pulse to the row conductor for the $M+1^{th}$ row of storage elements; and means for reading out the storage elements in said $M+1^{th}$ row sequentially after each card line is read by said sensing elements and before the next card line is read.

6. The combination as claimed in claim 5, including: two pairs of light responsive elements, the elements of the first pair being located relative to the processing elements so as to receive light concurrently from said source only when that portion of a card between one end line thereof and the associated edge of the card is presented to said processing elements, the elements of the second pair being located relative to the processing elements so as to receive light concurrently from said source only when no card is presented to said processing elements; an $M+1^{th}$ coincidence gate means including the elements of said first pair; an $M+2^{th}$ coincidence gate means including the elements of said second pair; and means coupling the outputs of said $M+1^{th}$ and said $M+2^{th}$ coincidence gate means as inputs to said OR gate.

7. In a system for processing punched record cards having M lines of N index point positions each, the combination comprising:

a transport path along which cards are fed singly in a direction transverse to the lines on the cards;

N perforation sensing devices positioned along said path to sense the index point positions a line at a time;

a memory having $M+1$ rows by N columns of coincident input storage elements;

each of the first M rows of elements corresponding to a different row of a record card, and each of the N elements of a row corresponding to a different index point position in a card row;

a separate row input conductor individual to each row of storage elements;

a separate column input conductor for each of the N columns of storage elements;

means coupling the output of each perforation sensing device to a different one of the column conductors;

means for applying a signal to a row conductor when the corresponding line of a record card is being sensed by said perforation sensing devices, and also applying a signal to the row conductor for the $M+1^{th}$ row to read into the latter row the data recorded in the card line being sensed; and means for reading out the storage elements in said $M+1^{th}$ row element by element after each card line is read by said sensing devices and before the next card line is read.

8. The combination as claimed in claim 7, including: a first set of M modulo X counters each functionally related to a different one of the M lines of a record card and the corresponding one of the first M rows in said memory; means for applying the signals read out of the elements in said $M+1^{th}$ row to that one of the M modulo counters which corresponds to the card line whose data is stored in the $M+1^{th}$ row prior to read-out thereof.

9. The combination as claimed in claim 8, including: a second set of M modulo X counters, one for each of the first M rows of said memory; means for reading out the first M rows of said memory a column at a time to the inputs of respective ones of said second set of modulo counters after a complete card has been read into memory; and means for comparing the counts stored in each of the modulo counters of the second set with the counts stored in corresponding modulo counters of the first set.

10. The combination as claimed in claim 7, including: means for applying an energizing signal selectively to the row conductor for the $M+1^{th}$ row of storage elements when that portion of a record card lying between one end line thereof and the corresponding edge of the card is presented to said sensing devices; means for reading out the $M+1^{th}$ row of storage elements a column at a time after said energizing signal terminates; and means for detecting for the presence of an output from any of the storage elements of the $M+1^{th}$ row during read-out thereof.

11. The combination as claimed in claim 7, including: means for applying an energizing signal selectively to the row conductor of the $M+1^{th}$ row of storage elements when no card is present at said sensing elements; means for reading out the $M+1^{th}$ row of storage elements a column at a time after said energizing signal terminates; and means for detecting for the absence of a switched storage element in said $M+1^{th}$ row during read-out thereof.

References Cited

UNITED STATES PATENTS

| | | | |
|---|---|---|---|
| 3,103,577 | 9/1963 | Willard | 235—61.11 X |
| 3,184,581 | 5/1965 | Willoughby. | |
| 3,217,294 | 11/1965 | Gerlach et al. | |
| 3,239,810 | 3/1966 | Jacoby | 340—146.2 |

DARYL W. COOK, *Primary Examiner*.

U.S. Cl. X.R.

235—61.7; 250—219; 340—174